United States Patent Office 3,573,997
Patented Apr. 6, 1971

3,573,997
PROCESS FOR THE COATING OF METAL
Elmer H. Plaxton, Bloomfield Hills, Mich., assignor to Hooker Chemical Corporation, Niagara Falls, N.Y.
No Drawing. Continuation-in-part of applications Ser. No. 378,982 and Ser. No. 378,946, both filed June 29, 1964. This application Dec. 31, 1968, Ser. No. 789,005
Int. Cl. C23f 7/10, 7/14, 7/26
U.S. Cl. 148—6.16
7 Claims

ABSTRACT OF THE DISCLOSURE

A process for coating metal wherein a phosphate or oxalate conversion coating composition is applied to an aluminum, zinc or ferrous metal surface to form a substantially dry, uniform phosphate or oxalate conversion coating, a portion of which is water-soluble. An organic containing, reducing and/or esterifying fixing or immobilizing coating composition is then applied which reacts out the water-soluble portion of the conversion coating to produce water-insoluble phosphates or oxalates and form a substantially dry, uniform composite coating. A hexavalent chromium containing stabilizing or passivating composition is also applied, either as a separate stage or, preferably, by including the hexavalent chromium material in the fixing coating composition. Preferably, all of the coating materials are applied by "mist-on" type spray applications.

---

This application is a continuation-in-part of my copending applications Ser. No. 378,946 and Ser. No. 378,982, filed June 29, 1964.

This invention relates to an improved process for coating metal surfaces and more particularly relates to improvements in the process for applying a protective coating to metallic surfaces such as zinc, iron, and aluminum.

The desirability of providing metal surfaces, and particularly metal surfaces which are predominantly zinc, iron or aluminum, with a protective coating, such as a phosphate coating, has long been recognized. Such coatings are particularly desirable for preventing staining or corrosion of the metal surfaces, or to provide a base for paint or similar protective coatings.

In the past, particularly with surfaces which are predominantly zinc, difficulties have sometimes been encountered in obtaining a sufficiently heavy or uniform coating to provide the desired protection for the surface. In other instances, the phosphate coating obtained has been sufficiently loose or non-adherent that it has been an unsatisfactory base for paint or other protective coatings. Often, these difficulties have increased or occurred more frequently when the coating has been applied to the surface of a moving strip or sheet of metal. In such instances, because of the speed at which the material is moving, the application of the coating material and the formation of the desired protective coating should be accomplished in a relatively short period of time. Moreover, it sometimes happens that in installations which treat predominantly zinc surfaces, such as those resulting from electroplating zinc or hot-dip galvanizing, it is also desirable to treat surfaces which are predominantly iron or aluminum. Heretofore, it has not generally been possible to treat such a variety of surfaces to provide a satisfactory protective or paint-base coating using the compositions and application techniques which have been available.

Additionally, with processes and compositions which have been available for such applications, close controls were used and frequently one or more rinses of the coated surfaces were employed to obtain acceptable results. Such operations have added to the complexity and costs of prior art processes.

It is, therefore, an object of the present invention to provide novel coating compositions of the reactive phosphate type which may be applied to metal surfaces which are predominantly zinc, iron, or aluminum, to provide an affective protective or paint-base coating.

Another object of the present invention is to provide a novel method whereby the coating compositions of the present invention may be easily and efficiently applied to metal surfaces of zinc, iron, or aluminum, which surfaces are in the form of sheets and/or strips and/or other shapes which may be coated using various spraying techniques.

A further object of the present invention is to provide novel compositions and methods for applying such compositions which are particularly adapted for forming paint-base coatings on zinc surfaces produced by hot-dip galvanizing.

Another object of the present invention is to provide a novel process for coating metallic surfaces and particularly, zinc surfaces, which process does not require close controls and rinses.

These and ohter objects of the invention will become apparent to those skilled in the art from the description of the invention which follows.

Pursuant to the above objects, the present invention includes a process for coating a metal surface which process comprises applying to the metal surface to be coated a phosphate or oxalate conversion coating composition, effecting formation of a substantially dry, uniform conversion coating on the metal surface, a portion of which is water-soluble, applying onto the thus-formed coating an organic-containing reducing and/or esterifying immobilizing or fixing coating composition reacting out the water-soluble portion of the previously formed conversion coating to produce water-insoluble phosphates or oxalates and form a substantially dry, uniform composite coating on the metal surface, and applying a hexavalent chromium containing stabilizing or passivating coating material to the surface to be protected.

Preferably in the present process, the conversion coating is applied using spray techniques and the metal surface to which it is applied is desirably at a temperature of at least about 175 degrees Fahrenheit. Moreover, in effecting the formation of substantially dry, uniform coatings, this may be done by a separate step, e.g., heating, after the application of the coating materials, or this may take place substantially simultaneously with the application of the coating material where the metal surface is sufficiently hot, e.g., at a temperature in excess of about 175 degrees Fahrenheit. Accordingly, both preheating and/or post heating of the metal surface may be used to effect formation of the substantially dry, uniform coating.

More specifically, in the process of the present invention, the preferred conversion coating composition is of the phosphate type in which the principal source of the phosphate ion is a metal phosphate wherein the metal has a valence of at least two. Typically, such conversion coating compositions are aqueous acidic solutions of a metal phosphate, such as zinc phosphate, ferrous phosphate, ferric phosphate, nickel phosphate, manganese phosphate, calcium phosphate, chromium phosphate, cobalt phosphate, aluminum phosphate, cadmium phosphate, and the like. Additionally, mixed metallic phosphates such as zinc nickel phosphate, zinc iron phosphate, zinc calcium phosphate, iron manganese phosphate, and the like may also be used. If desired, instead of the metal phosphates, the conversion coating solutions may contain phosphoric acid as the principal source of phosphate.

In such compositions, as well as in those based on metal phosphates particularly where these also contain iron, it is generally desirable to have an auxiliary acid, other than phosphoric acid, which acid may be either organic or inorganic. Exemplary of the auxiliary acids are nitric acid, acrylic acid, methacrylic acid, polyacrylic acid, adipic acid, acetic acid, hydroxyacetic acid, gluconic acid, fumaric acid, malic acid, maleic acid, malonic acid, latic acid, itaconic acid, tartaric acid, ethylenediamine tetraacetic acid, citric acid, hydroxymethyl phosphonic acid, oxalic acid, and the like. These auxiliary acids are typically present in amounts to provide a ratio of phosphate to the auxiliary acid in the range of about 100:1 to about 2:1, with amounts sufficient to provide a ratio of from about 10:1 to about 4:1 being preferred. It will be appreciated that in many instances, often depending upon the mode of application of the conversion coating composition the compositions, may contain the auxiliary acid in amounts both less than and greater than those which have been indicated hereinabove, to obtain comparable results.

Typically, the conversion coating compositions contain from about 0.1 to about 10.0 percent by weight phosphate, amounts within the range of about 0.3 to about 6.0 percent phosphate being preferred. In some instances, often depending upon the mode of application, amounts both less than 0.1 percent and greater than 10 percent may be used to obtain good results. As is known in the art, these and other phosphates provide the protective conversion coating on the metal surfaces being treated.

In addition to these materials, others may also be included in the conversion coating composition, e.g., materials which act as accelerators to reduce the time required to obtain a uniform, substantially continuous coating. Such materials include nitrates, nitrites, halides, e.g., bromides, chlorates, bromates, sulfites, perchlorates, iodates, peroxides, periodates, permanganates, organic nitro compounds such as m-nitrobenzene sulfonate, nitro guanidine, nitro methane, nitro ethane, 1-nitro propane, nitrobenzene, o-nitro benzaldehyde, p-nitrophenol, p-nitro anilin, p-nitrochloro benzene, picric acid and the like. Other additives which may be used in the composition are those which increase the etching tendency of the solution, such as the so-called complex fluorides, including fluosilicates, fluoborates, fluotitanates, fluostannates, fluozirconates, fluovanadates, and the like.

Inasmuch as the conversion coating composition is desirably in the form of an aqueous solution, the above and other additives are preferably added to the composition in the form which is readily dispersible in the aqueous solution. Many water dispersible forms of these compounds may be used provided they have no adverse effect on the coating composition, the metal substrate, or the coatings subsequently produced or applied. Typically such additives may be present in the conversion coating composition in amounts within the range of about 0.01 to about 6.0 percent by weight, and desirably in amounts within the range of 0.02 to about 4.0 percent by weight, although in many instances both lesser and greater amounts may be used.

In many instances, the oxalate or acetate radical may be substituted for the phosphate in these compositions to obtain comparable results. Exemplary of this is a conversion coating composition solution based on ferric oxalate, rather than the phosphate. Additionally, adjuvants other than those which have been indicated hereinabove may also be included in the compositions where particular properties and/or characteristics of the coating are desired. Typically, these conversion coating compositions are utilized at a pH within the range of about 0.7 to about 3.5 and the compositions are applied in such a manner so as to obtain a coating weight of phosphate ions of from about 10 to about 250 milligrams per square foot, of metal surface being treated. Desirably, the coatings obtained contain phosphate in the range of about 20 to about 100 milligrams per square foot. Here again both lesser and greater amounts may be used.

The conversion coating compositions are desirably applied to metal surfaces, which are preferably at a temperature of 175 degrees Fahrenheit, or higher, immediately before impingement of the phosphate composition. Typically, the temperatures are within a range of about 200 to about 600 degrees Fahrenheit, with temperatures in the range of about 275 to about 425 degrees Fahrenheit being most preferred. Although various metal surfaces may be treated in this manner, e.g., surfaces which are predominantly zinc, iron, or aluminum, excellent results have been obtained when coating zinc surfaces and, in particular, zinc surfaces obtained by hot-dip galvanizing. In such preferred applications, the process of the present invention may be carried out immedaitely following the hot-dip galvanizing operation, while the surfaces are still hot from the galvanizing bath. In this manner, the retained heat of the metal from the hot-dip galvanizing operation is utilized so that the application of additional heat to the surfaces may not be necessary. It will, of course, be appreciated that where the metal surface to be treated is not already hot from some previous processing step, preheating of the surface prior to the application of the conversion coating composition, may be carried out in many convenient ways to obtain the desired temperatures that have been indicated hereinabove.

The phosphate conversion coating compositions of the present invention may be applied to the metal surfaces by various means, for example, by spraying, immersion, flooding, roll-on and the like. Of these, various spraying techniques are generally utilized with the preferred method of application being by misting. In this latter technique, the coating solution to be applied is subjected to automization so as to obtain many very finely divided liquid particles which are deposited on the metal surface in such a manner that there is substantially no liquid run-off from the surface and a dry, substantially uniform coating is very quickly obtained, as the liquid components of the composition are evaporated by the heat of the metal surface. Typically, this will be effected by steam or other gas atomization. In such misting gas-atomized particles having a size in the range of about 15 to about 350 microns of the aqueous coating solution are directed toward a heated metal surface so as to form a coating on the surface by inter-reaction with the heated surface. The size of the particles, and the quantity and number of successive applications of these particles to the surface, are all controlled so that the particles of coating composition deposited on the surface remain in substantially the loci of their original impacts, and the surface is uniformly coated. Generally, it has been found that by utilizing such misting techniques for applying the coating compositions of the present invention, the time required to obtain a substantially dry, uniform coating on the surface being treated is greatly reduced and more efficient use of the coating composition is made with substantially no waste or run-off from the surface. Accordingly, hereinafter in referring to the application of the conversion coating compositions to the surfaces to be treated, primary reference will be made to the use of misting techniques to accomplish this application. This is not, however, to be taken as a limitation of the application techniques which may be used, as other and perhaps more conventional methods have been used in the process of the present invention to obtain excellent results.

It will be appreciated by those in the art that the application of the phosphate conversion coatings by misting to the heated zinc surfaces may be accomplished with many different types of equipment, depending upon the particular circumstances involved. For example, where the metal being treated is in the form of strips or large sheets, these may be passed through one or more stationary spraying or misting zones, wherein the size and number of the spraying zones, the concentration of the phosphate conversion coating solution and the particle size of the atomized solution may all be varied so as to obtain the desired coating weight, within the ranges indicated hereinabove. Alternatively, and particularly in treating smaller workpieces, hand spraying may be employed wherein multiple passes of the spray over the surface to be treated, for varying periods of time, may also be utilized to control and obtain the desired coating weights. These and other application methods are apparent to those in the art and the particular techniques utilized will, of course, depend upon the specific factors involved. In general, however, it has been found that the coating weights applied can be controlled over the greatest range by variations in the concentration of the coating solution.

After the formation of a substantially uniform phosphate conversion coating on the metal surface has been effected, a portion of which coating is water-soluble, an organic containing reducing and/or esterifying fixing composition is then applied to the thus-formed coating. As has been indicated hereinabove, due to the heat of the metal surface in the preferred method, the formation of a substantially dry, uniform phosphate conversion coating takes place very quickly and in many instances, substantially simultaneously with the application of the phosphate conversion coating material. Thus, the application of the fixed coating composition can be effected substantially immediately after the application of the phosphate conversion coating material, with no rinsing or curing of the phosphate coating.

The fixing coating composition contains organic reducing and/or esterifying materials which are reactive with the water-soluble portion of the previously formed phosphate conversion coating, which materials are preferably dissolved or dispersed in an aqueous media. In referring to fixing or immobilizing the phosphate conversion coating, it is meant that the second coating material applied reacts with the water-soluble portion of the previously applied phosphate coating to make it more adherent to a subsequently applied paint or similar protective coating and/or to make it provide an improved barrier between the metal substrate and materials with which it may come in contact which are likely to be corrosive or to lift the paint from the surface, such as water, thereby immobilizing or fixing the conversion coating on the metal surface.

The reactions by which this fixing is accomplished involve esterification and/or reduction of the water-soluble phosphate or oxalate portion of the conversion coating. This esterification and/or reduction results in the formation of water-insoluble phosphate or oxalate containing compositions. The organic compounds which may be included in the fixing composition to effect these reactions include mono alcohols, such as butanols, hexanols, tetrahydrofurfuryl alcohol and the like; diols, such as butene diols, butane diols, polypropylene glycols, resorcinol, ethyleneglycol and the like; polyols, such as those resulting from the condensation of ethylene oxide with propylene oxide and propylene glycol and the like; as well as organic reducing agents, such as dimethylolurea, hexamethylolmelamine, hydroquinone, pyrocatechol, pyrogallol, p-methylaminophenyl sulfate, N-p-hydroxyphenylglycine, and the like. With respect to the alcohols, diols and polyols, these typically will contain from about 3 to 20 carbon atoms in straight or branched chain or as an aromatic group.

In some instances, it has been found to be desirable to include a colloidal silica solution in the fixing composition. In this manner, there appears to be an enhancement of the quality of the coating obtained.

It is also believed that in some instances, particularly when using fixing materials which are predominantly of the reducing type, rather than esterifying, the overall reaction may also involve the hexavalent chromium which is concurrently or subsequently applied. The exact nature of this reaction is not known but it may involve the formation of trivalent chromium.

As with the phosphate conversion coating material, the concentration of the fixing components of the composition may be varied, typical concentrations being within the range of about 0.01 to about 6 percent by weight of the total composition, with amounts within the range of about 0.05 to about 1 percent being preferred. Similarly, the amount of the immobilizing component deposited on the surface being treated may also be varied, amounts within the range of about 1 to about 100 milligrams per square foot being typical with amounts within the range of about 15 to about 50 milligrams per square foot being preferred. The above concentrations and coating weights are exemplary of those which may be used, as both greater and lesser amounts give good results in many instances.

As with the phosphate conversion coating, the fixing composition may be applied to the surface to be treated without heating the surface, as for example, the surface temperatures being substantially at room temperature, e.g., 65–75 degrees Fahrenheit. Preferably, however, the surface temperatures are at least about 175 degrees Fahrenheit, and are typically within the range of about 200 to about 600 degrees Fahrenheit with temperatures below about 350 degrees Fahrenheit being most preferred. The fixing coating composition is applied to the surfaces using various convenient techniques, such as by roller coating, by immersing, by flooding, by spraying, utilizing various suitable spraying techniques, with the misting techniques of application being preferred. When the composition is applied to a surface at an elevated temperature, particularly when using misting techniques, the immobilizing or fixing composition reacts very quickly, and generally substantially simultaneously with its application, with the previously formed phosphate conversion coating to form a composite, substantially dry and uniform coating on the metal surface.

In addition to the fixing coating composition, there is also applied to the surface being treated, either after the application of the immobilizing composition or preferably in conjunction therewith, a hexavalent chromium containing passivating or stabilizing coating composition. Exemplary of the stabilizing composition which may be used are acidic aqueous solutions or suspensions of chromates and dichromates of metals having a valence of at least two. Typical of such materials which may be used are zinc chromate and dichromate, aluminum chromate and dichromate, calcium chromate and dichromate, iron, both ferric and ferrous, chromate and dichromate, cobalt chromate and dichromate, nickel chromate and dichromate, chromium chromate and dichromate and the like. Additionally, in many instances, aqueous solutions of chromic acid ($CrO_3$) may also be used. The chromic acid may be used as such, or if desired it may be combined with other materials, such as aluminum oxide, colloidal silica, water glass, solutions of zinc oxide in ammonium hydroxide, solutions of zinc oxide in ammonium hydroxide containing silica, and the like.

As has been indicated hereinabove, the stabilizing composition is preferably applied concurrently with the fixing composition, by incorporating the hexavalent chromium containing material in the fixing composition. Examples of such compositions have been indicated hereinabove. In such instances, the application of a separate stabilizing composition is not required, the chromium in the immobilizing or fixing composition being sufficient to effect the stabilizing function of a separately applied stabilizer coating. In this manner, there is obtained a coating which provides excellent corrosion protection as well as being an excellent paint base, in a two stage process rather than in three stages.

In applying the hexavalent chromium containing stabilizing composition either as a separate step, or preferably as a part of the fixing composition, the composition of the stabilizing material may be varied. Typically, the composition, based on $CrO_3$ content is within the range of about 0.01 to about 2 percent by weight, with amounts within the range of about 0.1 to about 1 percent by weight being preferred. Similarly, the coating weight of the composition on the surface treated may also be varied, with coatings containing $CrO_3$ within the range of about 0.1 to about 20 milligrams per square foot being typical and coating weights containing $CrO_3$ in the range of about 1 to about 8 milligrams per square foot being preferred. It will be appreciated that in many instances the concentrations used and the coating weights obtained may be higher or lower than the above values and still obtain good results.

When the stabilizing compositions are applied in a separate step many convenient means, including immersion and roller application, may be used, although spray techniques, and particularly misting techniques are preferred. Additionally, with regard to the temperature of the surface to which the stabilizing coating is applied, as with the application of the conversion coating and the fixing coating, it is not essential that the surface be heated. Accordingly, temperatures from room temperature, e.g., about 65—75 degrees F., up to temperatures of about 400° Fahrenheit, may be used. Typically, and where hot-dip galvanized surfaces are being treated, the surface temperature will be within the range of about 200 to 350 degrees Fahrenheit during the application of the stabilizing coating. It will, of course, be appreciated that where it is desired to obtain the stabilizing coating in a substantially dry condition in a relatively short period of time, surface temperatures and application techniques will be utilized which will provide this result. For example, surface temperatures above about 200 degrees Fahrenheit and the misting application techniques are used. It is to be appreciated that whether the present process uses two or three stages, rinses are not required or employed either between stages or after the final stage.

In carrying out the preferred method of the present invention, hot-dip galvanized surfaces, generally in the form of sheet or coil stock, are passed through a series of spray or misting zones wherein the compositions of the present invention are applied in either two or three stages, preferably two, by including the chromium stabilizer in the immobilizing composition. It has been found that the applications of these compositions to metal surfaces may be effected over a wide range of speeds for the work traveling through the misting application zone. For example, excellent results are obtained when applying the compositions to metal surfaces traveling at speeds from about 10 to over 500 feet per minute. By this method, there is obtained a high speed process for providing conversion coatings on metal surfaces, which process eliminates the need of rinsing the conversion coating after its application. The coatings produced by the method of the present invention are found to provide excellent corrosion protection on the metal surfaces to which they are applied and are also found to be excellent paint base coatings. Additionally, they also prevent white corrosion on storage of hot-dip galvanized metal.

In order that those skilled in the art may even more readily understand the present invention and the manner in which it may be practiced, the following specific examples are given. It is to be understood, of course, that these examples are illustrative of the present invention and are not intended to be taken as limitations thereof. In this application, unless otherwise indicated, the temperatures are expressed in degrees Fahrenheit, the parts and percentages are by weight, and the coating weights are in milligrams per square foot. Additionally, unless otherwise indicated, the coating compositions were applied to high-speed continuous hot-dip galvanized surfaces, known commercially as "Zincgrip" and said to be obtained by the continuous hot-dip zinc coating process disclosed in U.S. Patent 2,197,622. After these surfaces were coated, they were painted with an alkyd-melamine baking enamel and then subjected to 5 percent salt spray, humidity, and physical tests. The salt spray test is the American Society for Testing and Materials (ASTM) test B117–61 with painted panels scribed as given in ASTM test D–165461. This uses a 5 percent sodium chloride fog. The ratings given depend on the creepage from the scratch, given in $\frac{1}{16}$ of an inch. Ratings given as spot (S) indicate no creepage except in a small area. In the humidity test, panels were exposed in a walk-in room at 100 percent relative humidity at 100 degrees Fahrenheit, for the designated period of time. The blistering was rated according to ASTM designation D714–56 and is repoted as follows. D—dense; MD—medium dense; M—medium; FM—few medium; F—few; and VF—very few. In both the salt spray and humidity tests, unless otherwise indicated, the exposure time was 504 hours. In the physical test, adhesion is determined by knife blade and the results are reported on the scale of 0 to 10, where 10 is excellent, 8 is good, 6 is fair, 4 is poor, 2 is very poor, 0 is complete loss of adhesion. In the forming test, painted panels were subjected to a severe deformation producing parallel short radius right angle bends and paired thre dimensional short radius shoulders in one operation. Failures or degrees thereof are shown by percentage peeling of the paint.

In the following examples, the "Zincgrip" panels were solvent cleaned and then heated to a temperature within the range of about 275 to about 325 degrees Fahrenheit, generally about 300 degrees Fahrenheit. Thereafter, the various coatings were applied to the heated surface by misting techniques, the conversion coating solution generally having a $PO_4$ content of about 1 percent and being applied at a $PO_4$ coating weight of about 40 to 50 milligrams per square foot. The fixing coating composition generally had a concentration of about 0.25 percent and was applied at a coating rate of about 0.15 to 15 milligrams per square foot while the stabilizing composition generally had a $CrO_3$ content of about 0.2 percent and was applied at a $CrO_3$ coating weight of about 3 milligrams per square foot. Using the procedures as have been described hereinabove, the following examples were carried out and the indicated results were obtained. In these examples are given data on those experiments in which significant improved results in properties of embodiments of this invention were found.

| Example | Conversion coating | Immobilizing coating | Stabilizing coating |
|---|---|---|---|
| 1 | Zn and ferrous phosphate solvent content 0.1% Zn, 0.15% Fe, 1% $PO_4$ and 0.05% $HNO_3$. | | 0.2% aqueous solution of $CrO_3$. |
| 2 | Ferrous phosphate solvent containing 1% $PO_4$, 0.25% $NO_3$ and 0.15% Fe. | 0.05% aqueous solvent of N-P-hydroxyphenyl glycine. | 0.2% aqueous solvent of $CrO_3$. |
| 3 | Same as 2 | | Same as 2. |
| 4 | Same as 1 | 0.25% dispersion of $C_{16}$-$C_{18}$ alcohol. | Same as 1. |
| 5 | Same as 4 | 0.24% solution of tetrahydrofurfuryl alcohol. | Do. |
| 6 | do | 0.25% dispersion of polyether-diol. | Do. |
| 7 | Same as 1 except with 0.25% $HNO_3$. | Aqueous solution of 0.05% pyrocatechol and 0.3% colloidal $SiO_2$. | Do. |
| 8 | Same as 7 | Aqueous solution of 0.05% ethylene glycol and 0.3% colloidal $SiO_3$. | Do. |
| 9 | Same as 2 | Aqueous dispersion of 0.5% dimethylol urea and 0.2% of $CrO_3$ as $Cr_2(Cr_2O_7)_3$ | |

TEST RESULTS

| Example | Salt spray | Humidity | Knife adhesion | Forming, percent peel |
|---|---|---|---|---|
| 1 | 1-3 | | 6-5 | |
| 2 | | | 8 | 10 |
| 3 | | | 6 | 50 |
| 4 | | | 9 | 0 |
| 5 | | | 10-9 | 5 |
| 6 | | | 10-9 | 5 |
| 7 | | | 9-5 | 7.5 |
| 8 | | | 10 | 5 |
| 9 | 0-1 | F | 8 | 5 |

While there have been described various embodiments of the invention, the compositions and methods described are not intended to be understood as limiting the scope of the invention, as it is realized that changes therewithin are possible and it is further intended that each element recited in any of the following claims is intended to be understood as referring to all equivalent elements for accomplishing substantially the same results in substantially the same or equivalent manner, it being intended to cover the invention broadly in whatever form its principle may be utilized.

What is claimed is:

1. A method for coating aluminum, zinc and ferrous metal surfaces which comprises:
    (a) applying a phosphate or oxalate conversion coating composition to the metal surface;
    (b) forming on the metal surface a substantially dry, uniform conversion coating, a portion of which is water-soluble;
    (c) applying thereto an aqueous reducing and/or esterifying fixing coating composition to deposit at least about 1 milligram of reducing and/or esterifying fixing agent per square foot of metal surface, the reducing and esterifying agents selected from the group consisting of monohydric alcohols, polyols, dimethylolurea, hexa-methylolmelamine, hydroquinone, pyrocatechol, pyrogallol, p-methylaminophenyl sulfate and N-p-hydroxyphenylglycine;
    (d) reacting out the water-soluble portion of the previously formed conversion coating to produce water-insoluble phosphates or oxalates and form a substantially dry, uniform, composite coating on the metal surface; and subsequently
    (e) applying a hexavalent chromium-containing stabilizing coating material to the surface to be coated.

2. The method as claimed in claim 1 wherein the conversion coating composition is an aqueous phosphate composition wherein the predominate source of phosphate ions are metal phosphates, the metal of which is selected from the group consisting of zinc, ferric iron, ferrous iron, nickel chromium, cobalt, calcium, cadmium manganese, and mixtures thereof.

3. The method as claimed in claim 2 wherein the conversion coating composition is sprayed onto the metal surface and the metal surface is at a temperature of at least about 175 degrees Fahrenheit.

4. The method as claimed in claim 3 wherein the conversion coating composition has a phosphate concentration of from about 0.1 to 10% by weight and is applied so as to provide a phosphate coating weight of from about 10 to 250 milligrams per square foot, and the fixing coating composition contains from about 0.1 to 6% by weight of the organic reducing and/or esterifying components and from about 0.01 to 2% by weight of hexavalent chromium and is applied so as to provide a coating weight of from about 1 to 100 milligrams per square foot and a coating weight of $CrO_3$ of from about 0.1 to 20 milligrams per square foot.

5. The method as claimed in claim 1 wherein the fixing composition also contains colloidal silica.

6. The method as claimed in claim 5 wherein the metal surface to which the conversion coating is applied is at a temperature of from about 175° to 600° F.

7. A metallic surface having a protective coating thereon produced in accordance with the method of claim 1.

References Cited

UNITED STATES PATENTS

| | | | |
|---|---|---|---|
| 2,030,601 | 2/1936 | McDonald | 148—6.16 |
| 2,301,983 | 11/1942 | Tanner | 148—6.16X |
| 2,762,732 | 9/1956 | Somers | 148—6.2 |
| 2,768,104 | 10/1956 | Schuster et al. | 148—6.2X |
| 2,813,813 | 11/1957 | Ley | 148—6.15 |
| 2,928,762 | 3/1960 | Hyams | 148—6.16 |
| 3,063,877 | 11/1962 | Schiffman | 148—6.16 |

RALPH S. KENDALL, Primary Examiner

U.S. Cl. X.R.

148—6.2, 6.27